(12) United States Patent
Honda et al.

(10) Patent No.: US 10,696,788 B2
(45) Date of Patent: Jun. 30, 2020

(54) SURFACE TREATMENT AGENT

(71) Applicant: DAIKIN INDUSTRIES, LTD., Osaka-shi, Osaka (JP)

(72) Inventors: Yoshiaki Honda, Settsu (JP); Nozomi Katsuma, Settsu (JP); Reina Moriyasu, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 49 days.

(21) Appl. No.: 15/735,268

(22) PCT Filed: Jun. 10, 2016

(86) PCT No.: PCT/JP2016/067418
§ 371 (c)(1),
(2) Date: Dec. 11, 2017

(87) PCT Pub. No.: WO2016/199908
PCT Pub. Date: Dec. 15, 2016

(65) Prior Publication Data
US 2018/0171144 A1    Jun. 21, 2018

(30) Foreign Application Priority Data
Jun. 12, 2015 (JP) ................................ 2015-119826

(51) Int. Cl.
| | |
|---|---|
| *C08G 65/336* | (2006.01) |
| *C08G 18/83* | (2006.01) |
| *C07F 7/21* | (2006.01) |
| *G02B 1/113* | (2015.01) |
| *C07F 7/18* | (2006.01) |
| *C08G 18/79* | (2006.01) |
| *C08G 18/10* | (2006.01) |
| *C09D 175/04* | (2006.01) |
| *C08G 18/48* | (2006.01) |
| *C08G 18/71* | (2006.01) |
| *C08G 18/32* | (2006.01) |
| *C09K 3/18* | (2006.01) |
| *G02B 1/18* | (2015.01) |
| *C09D 4/00* | (2006.01) |

(52) U.S. Cl.
CPC .......... *C08G 65/336* (2013.01); *C07F 7/1804* (2013.01); *C07F 7/21* (2013.01); *C08G 18/10* (2013.01); *C08G 18/3206* (2013.01); *C08G 18/4854* (2013.01); *C08G 18/718* (2013.01); *C08G 18/792* (2013.01); *C08G 18/837* (2013.01); *C09D 175/04* (2013.01); *C09K 3/18* (2013.01); *G02B 1/113* (2013.01); *G02B 1/18* (2015.01); *C09D 4/00* (2013.01)

(58) Field of Classification Search
CPC ............................ C08G 18/718; C08G 18/837
See application file for complete search history.

(56) References Cited

U.S. PATENT DOCUMENTS

| | | | |
|---|---|---|---|
| 3,592,795 A * | 7/1971 | Ashby | ................. C08G 18/718 528/29 |
| 5,227,410 A | 7/1993 | Eckberg et al. | |
| 6,183,872 B1 | 2/2001 | Tanaka et al. | |
| 2008/0044735 A1 | 2/2008 | Ryu et al. | |
| 2008/0241892 A1* | 10/2008 | Roitman | ................ C12N 11/14 435/91.2 |
| 2009/0208728 A1 | 8/2009 | Itami et al. | |
| 2011/0077422 A1 | 3/2011 | Hagiwara | |
| 2014/0336401 A1 | 11/2014 | Toyama et al. | |
| 2015/0133622 A1* | 5/2015 | Harumashi | ............. C08L 83/04 528/32 |

FOREIGN PATENT DOCUMENTS

| | | |
|---|---|---|
| EP | 0 545 660 A1 | 6/1993 |
| EP | 2 301 986 A1 | 3/2011 |
| EP | 3 309 164 A1 | 4/2018 |
| JP | 05-255508 A | 10/1993 |
| JP | 2001-131243 A | 5/2001 |
| JP | 2005-281143 A | 10/2005 |
| JP | 2008-044934 A | 2/2008 |
| JP | 2008-534696 A | 8/2008 |
| JP | 2011-068777 A | 4/2011 |
| JP | 2013-060354 A | 4/2013 |
| JP | 2013-076094 A | 4/2013 |
| JP | 2013-124362 A | 6/2013 |
| JP | 2014-065827 A | 4/2014 |
| WO | 97/07155 A1 | 2/1997 |
| WO | 2013/089043 A1 | 6/2013 |
| WO | 2014/177627 A1 | 11/2014 |
| WO | WO 2018/130713 * | 7/2018 |

OTHER PUBLICATIONS

Abstract for KR 1719340B1 (Mar. 2017).*
International Search Report for PCT/JP2016/067418, dated Aug. 23, 2016.
Communication dated Jan. 31, 2019 from the European Patent Office in application No. 16807613.1.
International Preliminary Report on Patentability with translation of Written Opinion dated Dec. 21, 2017 in counterpart international application No. PCT/JP2016/067418.

* cited by examiner

*Primary Examiner* — Marc S Zimmer
(74) *Attorney, Agent, or Firm* — Sughrue Mion, PLLC

(57) ABSTRACT

The present invention provides a compound represented by general formula (A1) or (A2):

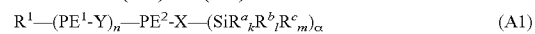

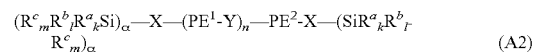

wherein each of symbols is as defined in the description.

20 Claims, No Drawings

SURFACE TREATMENT AGENT

This application is a National Stage of International Application No. PCT/JP2016/067418, filed Jun. 10, 2016, claiming priority based on Japanese Patent Application No. 2015-119826, filed Jun. 12, 2015, the contents of all of which are incorporated herein by reference in their entirety.

TECHNICAL FIELD

The present invention relates to a (poly)ether group containing silane compound and a surface-treating agent comprising it.

BACKGROUND ART

A certain silane compound is known to be able to provide excellent functions (for example, water-repellency, oil-repellency, antifouling property, or the like) when it is used in a surface treatment of a base material. A layer (hereinafter, referred to as a "surface-treating layer") formed from a surface-treating agent comprising a silane compound is applied to various base materials such as a glass, a plastic, a fiber and a building material as a so-called functional thin film.

As such silane compound, a fluorine-containing silane compound is known. In specifically, Patent Documents 1 and 2 disclose a perfluoropolyether group containing silane compound having a hydrolyzable group bonding to a Si atom in its molecular terminal or terminal portion.

As another compound, a polyether group-containing silane compound is known. In specifically, Patent Documents 3 and 4 disclose a polyether group containing silane compound having a hydrolyzable group bonding to a Si atom in its molecular terminal or terminal portion.

PRIOR ART DOCUMENT

Patent Document

Patent Document 1: International Publication No. 97/07155
Patent Document 2: JP 2008-534696 A
Patent Document 3: JP 2013-60354 A
Patent Document 4: JP 2014-65827 A

SUMMARY OF THE INVENTION

Problem to be Solved by the Invention

The surface treating layer formed from the surface treating agent of Patent Documents 1-4 has been suitably used in an optical member such as glasses, a touch panel or the like which is required to have light permeability or transparency since it can exert the above functions even in form of a thin film. In these applications, the adhesion of the fingerprint can be a problem.

The surface treating layer formed from the surface treating agent comprising the perfluoropolyether group containing silane compound as described in Patent Documents 1 and 2 has excellent water-repellency and oil-repellency, the adhesion of the fingerprint hardly occurs. In the surface treating layer formed from the surface treating agent comprising the perfluoropolyether group containing silane compound, the adhesion amount of the fingerprints is small. However, when the fingerprint adheres, adhered sebum is scattering the light due to the excellent water-repellency and the excellent oil repellency, i.e., a high contact angle, as a result, there is a problem that fingerprint is noticeable.

Since the surface treating layer formed from the surface treating agent comprising the polyether group containing silane compound as described in Patent Documents 1 and 2 has high lipophilicity, adhered sebum is to the layer. Therefore, even when the fingerprint adheres, the fingerprint is inconspicuous. However, there is a problem that the surface treating layer formed from the surface treating agent comprising the polyether group containing silane compound as described in Patent Documents 1 and 2 has low friction durability, and cannot maintain the functions for a long time.

An object of the present invention is to provide a silane compound which is able to form a layer having low visibility of adhered fingerprints and high friction durability and a surface-treating agent comprising it.

Means to Solve the Problem

As a result of intensively studying, the inventors of the present invention have found that by using a polyether group containing silane compound having a plurality of a Si group having a hydrolyzable group which is to bind a base material, a layer having low visibility of adhered fingerprints and high friction durability is able to be formed, and the inventors reach the present invention.

Therefore, according to the first aspect of the present invention, there is provided a compound of the following formula (A1) or (A2):

(A1)

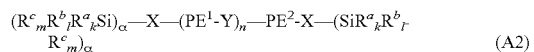

(A2)

wherein:
$R^1$ is $OR^4$;
$R^4$ is a hydrogen atom or an alkyl group having 1-20 carbon atoms;
$PE^1$ is each independently at each occurrence a group of the formula:

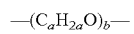

wherein:
a is an integer of 1-6 independently per a unit in parentheses with the subscript b;
b is each independently at each occurrence an integer of 1-200;
Y is each independently at each occurrence a single bond or —CONH—$R^5$—NHCOO—;
$R^5$ is each independently at each occurrence a divalent organic group;
n is an integer of 1-50;
$PE^2$ is a single bond or the above —$(C_aH_{2a}O)_b$— group;
X is each independently a single bond or a 2-10 valent organic group;
$R^a$ is each independently at each occurrence —Z—$SiR^{71}_pR^{72}_qR^{73}_r$;
Z is each independently at each occurrence an oxygen atom or a divalent organic group;
$R^{71}$ is each independently at each occurrence $R^{a'}$;
$R^{a'}$ has the same definition as that of $R^a$;
in $R^a$, the number of Si atoms which are straightly linked via the Z group is up to five;
$R^{72}$ is each independently at each occurrence a hydroxyl group or a hydrolyzable group;
$R^{73}$ is each independently at each occurrence a hydrogen atom or a lower alkyl group;

p is each independently at each occurrence an integer of 0-3;

q is each independently at each occurrence an integer of 0-3;

r is each independently at each occurrence an integer of 0-3;

in one $R^a$, the sum of p, q and r is 3;

$R^b$ is each independently at each occurrence a hydroxyl group or a hydrolyzable group;

$R^c$ is each independently at each occurrence a hydrogen atom or a lower alkyl group;

k is each independently at each occurrence an integer of 0-3;

l is each independently at each occurrence an integer of 0-3;

m is each independently at each occurrence an integer of 0-3;

in a unit in parentheses with the subscript α, the sum of k, l and m is 3;

α is each independently an integer of 1-9; and in $(SiR^a{}_k R^b{}_l R^c{}_m)_\alpha$ units which are connected to the same X, a total of Si atoms having $R^b$ or $R^{72}$ is 2 or more.

According to the second aspect of the present invention, there is provided a surface-treating agent comprising at least one compound of the formula (A1) or the formula (A2).

According to the third aspect of the present invention, there is provided an article comprising a base material and a layer which is formed on a surface of the base material from the surface-treating agent.

Effect of the Invention

According to the present invention, there is provided a novel the (poly)ether group containing silane compound and a surface-treating agent comprising it. By using this surface-treating agent, a layer is able to be formed, which has low visibility of adhered fingerprints even when the fingerprints are adhered and high friction durability.

EMBODIMENTS TO CARRY OUT THE INVENTION

Hereinafter, the compound of the present invention will be described.

A "hydrocarbon group" as used herein represents a group containing a carbon atom and a hydrogen atom which is obtained by removing a hydrogen atom from a hydrocarbon. Examples of the hydrocarbon group include, but are not particularly limited to, a hydrocarbon group having 1-20 carbon atoms which may be substituted with one or more substituents, for example, an aliphatic hydrocarbon group, an aromatic hydrocarbon group, and the like. The "aliphatic hydrocarbon group" may be straight, branched or cyclic, and may be saturated or unsaturated. The hydrocarbon group may contain one or more ring structures. It is noted that the hydrocarbon group may have one or more N, O, S, Si, amide, sulfonyl, siloxane, carbonyl, carbonyloxy, or the like at its end or in its molecular chain.

As used herein, examples of the substituent of the "hydrocarbon group" include, but are not particularly limited to, for example a halogen atom; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5-10 membered heterocyclyl group, a 5-10 membered unsaturated heterocyclyl group, a $C_{6-10}$ aryl group, a 5-10 membered heteroaryl group, and the like, which may be substituted by one or more halogen atoms.

A "2-10 valent organic group" as used herein represents a 2-10 valent group containing a carbon atom. Examples of the 2-10 valent organic group include, but are not particularly limited to, a 2-10 valent group obtained by removing 1-9 hydrogen atoms from a hydrocarbon group. For example, examples of the divalent organic group include, but are not particularly limited to, a divalent group obtained by removing one hydrogen atom from a hydrocarbon group from a hydrocarbon group.

The present invention provides at least one (poly)ether group containing silane compound of the formula (A1) or (A2).

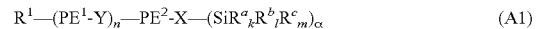
(A1)

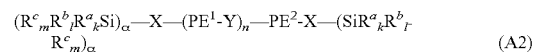
(A2)

In the above formula (A1) or (A2), $R^1$ is $OR^4$.

$R^4$ is a hydrogen atom or an alkyl group having 1-20 carbon atoms. The alkyl group having 1-20 carbon atoms may be straight or branched, preferably straight. The alkyl group having 1-20 carbon atoms may be preferably an alkyl group having 1-10 carbon atoms, more preferably an alkyl group having 1-6 carbon atoms. In particular, the alkyl group having 1-20 carbon atoms is preferably a methyl group, an ethyl group or an n-propyl group, more preferably a methyl group. $R_4$ is preferably a hydrogen atom or a methyl group, more preferably a hydrogen atom.

In the above formula (A1) or (A2), $PE^1$ is each independently at each occurrence a group of the following formula:

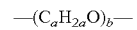

wherein:

a is an integer of 1-6, preferably an integer of 2-4, independently per a unit in parentheses with the subscript b;

b is each independently at each occurrence an integer of 1-200, preferably an integer of 5-200, more preferably an integer of 5-100, further preferably an integer of 5-50.

In the above formula (A1) or (A2), $PE^2$ is each independently at each occurrence a single bond or a group of the following formula:

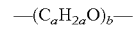

wherein a and b are as defined above.

In a preferably embodiment, $-(C_aH_{2a}O)_b-$ in $PE^1$ and $PE^2$ is each independently at each occurrence is a group of the formula:

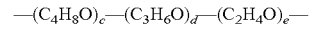

wherein:

c, d and e are each independently at each occurrence an integer of 0-200, for example, an integer of 1-200, preferably an integer of 5-200, more preferably an integer of 5-100, further preferably an integer of 5-50;

the sum of c, d and e is 1-200, preferably 5-200, more preferably 5-100, further preferably 5-50; and the occurrence order of the respective repeating units in parentheses with the subscript c, d or e is not limited in the formula.

In a preferably embodiment, in the formula (A1) or (A2), in at least one of the units $-(C_aH_{2a}O)-$, a is 4. That is, the formula (A1) or (A2) has at least one $-C_4H_8O-$ group. The $-C_4H_8O-$ group is preferably straight. By containing the $-C_4H_8O-$ group, the compound of the present invention can form a surface treating layer which has low visibility of fingerprints and that the trace of fingerprints can be easily obscured.

In the above embodiment, a ratio of the number of $(C_4H_8O)$ units and the number of the $(C_3H_6O)$ units, and the number of $(C_2H_4O)$ units is not particularly limited. In a preferably embodiment, the number of $(C_3H_6O)$ units and the number of $(C_2H_4O)$ units may be 100% or less of the number of $(C_4H_8O)$ units, preferably 80% or less, more preferably 50% or less, further preferably 30% or less, respectively.

In one embodiment, —$(C_aH_{2a}O)_b$— in $PE^1$ and $PE^2$ is each independently at each occurrence a group of the formula:

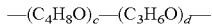

wherein:

c and d are each independently at each occurrence an integer of 0-200, for example, an integer of 1-200, preferably an integer of 5-200, more preferably an integer of 5-100, further preferably an integer of 5-50;

the sum of c and d 1-200, preferably 5-200, more preferably 5-100, further preferably 5-50; and the occurrence order of the respective repeating units in parentheses with the subscript c or d is not limited in the formula.

In the above embodiment, a ratio of the number of $(C_4H_8O)$ units and a ratio of the number of $(C_3H_6O)$ units is not particularly limited. In a preferably embodiment, the number of $(C_3H_6O)$ units may be 100% or less of the number of $(C_4H_8O)$ units, preferably 80% or less, more preferably 50% or less, further preferably 30% or less.

In another embodiment, $PE^1$ and $PE^2$ are each independently at each occurrence selected form:

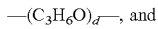, and

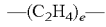

wherein, c, d and e are each independently, an integer of 1-200, preferably an integer of 5-200, more preferably an integer of 5-100, further preferably an integer of 5-50. That is, in this embodiment, $PE^1$ and $PE^2$ are each independently a homopolymer unit of —$(C_4H_7O)_c$—, —$(C_3H_6O)_d$—, or —$(C_2H_4O)_e$—. In a preferably embodiment, in the formula (A1) or (A2), at least one —$(C_4H_8O)_c$— homopolymer unit is contained. Furthermore, in the formula (A1) or (A2), in addition to —$(C_4H_8O)_c$— homopolymer unit, two other units or one other unit may be contained.

In the above embodiment, the abundance ratio of each homopolymer unit is not particularly limited, and preferably, the number of —$(C_3H_6O)_d$— homopolymer units and the number of —$(C_2H_4O)_e$— homopolymer units may be 80% or less, preferably 50% or less, more preferably 30% or less of the number of —$(C_4H_8O)_c$— homopolymer units, respectively.

In a preferably embodiment, $PE^1$ and $PE^2$ are independently at each occurrence a group selected from:

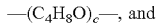, and

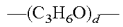

wherein, c and d are each independently an integer of 1-200, preferably an integer of 5-200, more preferably an integer of 5-100, further preferably an integer of 5-50. In a preferably embodiment, in the formula (A1) or (A2), at least one —$(C_4H_8O)_c$— homopolymer unit is contained.

In the above embodiment, the abundance ratio of each homopolymer unit is not particularly limited, and preferably, the number of —$(C_3H_6O)_d$— homopolymer units may be 80% or less, preferably 50% or less, more preferably 30% or less of the —$(C_4H_8O)_c$— homopolymer.

In more preferably embodiment, $PE^1$ and $PE^2$ is each independently at each occurrence a group of the formula:

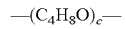

wherein c is an integer of 1-200, preferably an integer of 5-200, more preferably an integer of 5-100, further preferably an integer of 5-50. That is, in this embodiment, $PE^1$ and $PE^2$ consist of —$C_4H_8O$— unit.

Among these repeating units of the polyether, —$(C_4H_8O)$— may be any of —$(CH_2CH_2CH_2CH_2O)$—, —$(CH(CH_3)CH_2CH_2O)$—, —$(CH_2CH(CH_3)CH_2O)$—, —$(CH_2CH_2CH(CH_3)O)$—, —$(C(CH_3)_2CH_2O)$—, —$(CH_2C(CH_3)_2O)$—, —$(CH(CH_3)CH(CH_3)O)$—, —$(CH(C_2H_5)CH_2O)$— and —$(CH_2CH(C_2H_5)O)$—, preferably —$(CH_2CH_2CH_2CH_2O)$—. The —$(C_3H_6O)$— group may be any of —$(CH_2CH_2CH_2O)$—, —$(CH(CH_3)CH_2O)$— and —$(CH_2CH(CH_3)O)$—, preferably —$(CH_2CH(CH_3)O)$—. The —$(C_2H_4O)$— group may be any of —$(CH_2CH_2O)$— and —$(CH(CH_3)O)$—, preferably —$(CH_2CH_2O)$—.

In the above formula (A1) or (A2), Y is each independently at each occurrence a single bond or —CONH—$R^5$—NHCOO—.

$R^5$ is each independently at each occurrence a divalent organic group.

$R^5$ may be preferably a divalent aliphatic hydrocarbon group having 1-20 carbon atoms or a divalent aromatic hydrocarbon group having 3-20 carbon atoms, which may have a substituent group, or the combination thereof. The aliphatic hydrocarbon group may be straight, branched or cyclic. In one embodiment, $R^5$ may be an alkylene having 1-20 carbon atoms, a cycloalkylene having 3-20 carbon atoms, or an arylene having 3-20 carbon atoms, which may have a substituent group, or the combination thereof. Examples of the substituent include preferably an alkyl group having 1-6 carbon atoms.

In one embodiment, $R^5$ may be a group of the following formula:

—$(CH_2)_{x'}$— wherein x' is an integer of 1-6, for example an integer of 1-4;

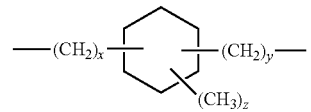

wherein x and y are each independently an integer of 0-6, for example an integer of 0-3 or 1-3;

z is an integer of 0-10, for example, an integer of 0-4 or 1-4,

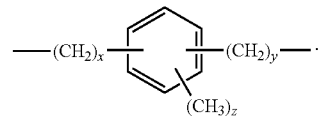

wherein x and y are each independently, an integer of 0-6, for example, an integer of 0-3 or 1-3;

z is an integer of 0-4, for example, an integer of 0-3 or 1-3, and when x or y is 0, —$(CH_2)_x$— or —$(CH_2)_y$— means a single bond (a bond), respectively.

In the above formula (A1) or (A2), n is an integer of 1-50, preferably an integer of 1-30, for example, an integer of 5-30 or an integer of 10-20.

In the above formula (A1) or (A2), X is each independently a single bond or a 2-10 valent organic group. X is recognized to be a linker which connects between a polyether moiety (i.e., a $R^1$—$(PE^1\text{-}Y)_n$—$PE^2$- moiety or —$(PE^1\text{-}Y)_n$—$PE^2$- moiety) providing mainly surface function and a silane moiety (i.e., a group in parentheses with the subscript α) providing an ability to bind to a base material in the compound of the formula (A1) and (A2). Therefore, X may be any organic group as long as the compound of the formula (A1) and (A2) can stably exist.

In the formula, α is an integer of 1-9. "α" may be varied depending on the valence number of the X group. In the formula (A1) or (A2), α is a value obtained by subtracting 1 from the valence number of X. For example, when X is 10 valent organic group, α is 9, when X is 5 valent organic group, α is 4, and when X is a divalent organic group, α is 1.

X is preferably 2-8 valent, for example, 3-8 valent, more preferably 2-6 valent, for example, 3-6 valent.

In one embodiment, X may be $X^{1a}$.

Examples of $X^{1a}$ include, but are not particularly limited to, for example a divalent group of the following formula:

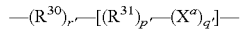

wherein:
$R^{30}$ is —CONH— or —CO—, preferably —CONH—;
r' is 0 or 1,
$R^{31}$ is a single bond, —$(CH_2)_{s'}$— or an o-, m- or p-phenylene group, preferably —$(CH_2)_{s'}$—,
s' is an integer of 1-20, preferably an integer of 1-6, more preferably an integer of 1-3, further more preferably 1 or 2,
$X^a$ is —$(X^b)_{l'}$—,
$X^b$ is each independently at each occurrence a group selected from the group consisting of —O—, —S—, an o-, m- or p-phenylene group, —C(O)O—, —Si$(R^{33})_2$—, —(Si$(R^{33})_2$O$)_{m'}$—Si$(R^{33})_2$—, —CONR$^{34}$—, —O—CONR$^{34}$—, —NR$^{34}$— and —$(CH_2)_{n'}$—,
$R^{33}$ is each independently at each occurrence a phenyl group, a $C_{1-6}$ alkyl group or a $C_{1-6}$ alkoxy group, preferably a phenyl group or a $C_{1-6}$ alkyl group, more preferably a methyl group,
$R^{34}$ is each independently at each occurrence a hydrogen atom, a phenyl group or a $C_{1-6}$ alkyl group (preferably a methyl group),
m' is each independently at each occurrence an integer of 1-100, preferably an integer of 1-20,
n' is each independently at each occurrence an integer of 1-20, preferably an integer of 1-6, more preferably an integer of 1-3,
l' is an integer of 1-10, preferably an integer of 1-5, more preferably an integer of 1-3,
p' is 0 or 1,
q' is 0 or 1, and
at least one of p' and q' is 1, and the occurrence order of the respective repeating units in parentheses with the subscript p' or q' in [$(R^{31})_{p'}$—$(X^a)_{q'}$] is not limited in the formula. Here, $R^{31}$ and $X^a$ (typically, a hydrogen atom in $R^{31}$ and $X^a$) may be substituted with one or more substituents selected from a $C_{1-3}$ alkyl-group.

Preferably, $X^{1a}$ is —$(R^{30})_{r'}$—$(X^a)_{q'}$—$R^{32}$—. $R^{32}$ is a single bond, —$(CH_2)_{t'}$— or an o-, m- or p-phenylene group, preferably —$(CH_2)_{t'}$—. t' is an integer of 1-20, preferably an integer of 2-6, more preferably an integer of 2-3. Here, $R^{32}$ (typically, a hydrogen atom in $R^{32}$) may be substituted with one or more substituents from a $C_{1-3}$ alkyl group.

Preferably, $X^{1a}$ may be
a —$R^{30}$—$C_{1-20}$ alkylene group,
—$R^{30}$—$R^{31}$—$X^c$—$R^{32}$—,
—$R^{30}$—$X^d$—$R^{32}$—,
$C_{1-20}$ alkylene group,
—$R^{31}$—$X^c$—$R^{32}$—, or
—$X^d$—$R^{32}$—
wherein $R^{30}$, $R^{31}$ and $R^{32}$ are as defined above.

More preferably $X^{1a}$ may be
a —$R^{30}$—$C_{1-20}$ alkylene group,
—$R^{30}$—$(CH_2)_{s'}$—$X^c$—,
—$R^{30}$—$(CH_2)_{s'}$—$X^c$—$(CH_2)_{t'}$—,
—$R^{30}$—$X^d$—,
—$R^{30}$—$X^d$—$(CH_2)_{t'}$—,
a $C_{1-20}$ alkylene group,
—$(CH_2)_{s'}$—$X^c$—,
—$(CH_2)_{s'}$—$X^c$—$(CH_2)_{t'}$—
—$X^d$—, or
—$X^d$—$(CH_2)_{t'}$—
wherein $R^{30}$, s' and t' are as defined above.

In the above formula, $X^c$ is
—O—,
—S—,
—C(O)O—,
—CONR$^{34}$—,
—O—CONR$^{34}$—,
—Si$(R^{33})_2$—,
—(Si$(R^{33})_2$O$)_{m'}$—Si$(R^{33})_2$—,
—O—$(CH_2)_{u'}$—(Si$(R^{33})_2$O$)_{m'}$—Si$(R^{33})_2$—,
—O—$(CH_2)_{u'}$—Si$(R^{33})_2$—O—Si$(R^{33})_2$—CH$_2$CH$_2$—Si$(R^{33})_2$—O—Si$(R^{33})_2$—,
—O—$(CH_2)_{u'}$—Si(OCH$_3$)$_2$OSi(OCH$_3$)$_2$—,
—CONR$^{34}$—$(CH_2)_{u'}$—(Si$(R^{33})_2$O$)_{m'}$—Si$(R^{33})_2$—,
—CONR$^{34}$—$(CH_2)_{u'}$—N(R$^{34}$)—, or
—CONR$^{34}$-(o-, m- or p-phenylene)-Si$(R^{33})_2$—
wherein $R^{33}$, $R^{34}$ and m' are as defined above,
u' is an integer of 1-20, preferably an integer of 2-6, more preferably an integer of 2-3. $X^c$ is preferably —O—.

In the above formula, $X^d$ is,
—S—,
—C(O)O—,
—CONR$^{34}$—,
—CONR$^{34}$—$(CH_2)_{u'}$—(Si$(R^{33})_2$O)—Si$(R^{33})_2$—,
—CONR$^{34}$—$(CH_2)_{u'}$—N(R$^{34}$)—, or
—CONR$^{34}$-(o-, m- or p-phenylene)-Si$(R^{33})_2$—
wherein each of symbols is as defined above.

More preferably, $X^{1a}$ may be
a —$R^{30}$—$C_{1-20}$ alkylene group,
—$R^{30}$—$(CH_2)_{s'}$—$X^c$—$(CH_2)_{t'}$—,
—$R^{30}$—$X^d$—$(CH_2)_{t'}$—,
a $C_{1-20}$ alkylene group,
—$(CH_2)_{s'}$—$X^c$—$(CH_2)_{t'}$—, or
—$X^d$—$(CH_2)_{t'}$—
wherein each of symbols is as defined above.

Further more preferably, $X^{1a}$ is
a —$R^{30}$—$C_{1-20}$ alkylene group,
—$R^{30}$—$(CH_2)_{s'}$—O—$(CH_2)_{t'}$—,
—$R^{30}$—$(CH_2)_{s'}$—Si$(R^{33})_2$O$)_{m'}$—Si$(R^{33})_2$—$(CH_2)_{t'}$—,
—$R^{30}$—$(CH_2)_{s'}$—O—$(CH_2)_{u'}$—(Si$(R^{33})_2$O$)_{m'}$—Si$(R^{33})_2$—$(CH_2)_{t'}$—,
—$R^{30}$—$(CH_2)_{s'}$—O—$(CH_2)_{t'}$—Si$(R^{33})_2$—$(CH_2)_{u'}$—Si$(R^{33})_2$—$(C_vH_{2v})$—,
a $C_{1-20}$ alkylene group,
—$(CH_2)_{s'}$—O—$(CH_2)_{t'}$—,
—$(CH_2)_{s'}$—(Si$(R^{33})_2$O$)_{m'}$—Si$(R^{33})_2$—$(CH_2)_{t'}$—, —(CH$_2$)$_{s'}$—O—(CH$_2$)$_{u'}$—(Si(R$^{33}$)$_2$O)$_{m'}$—Si(R$^{33}$)$_2$—(CH$_2$)$_{t'}$—, or —(CH$_2$)$_{s'}$—O—(CH$_2$)$_{t'}$—Si(R$^{33}$)$_2$—(CH$_2$)$_{u'}$—Si(R$^{33}$)$_2$—(C$_v$H$_{2v}$)— wherein —R$^{30}$, R$^{33}$, m', s', t' and u' are as defined above, v is an integer of 1-20, preferably an integer of 2-6, more preferably an integer of 2-3.

In the above formula, —(C$_v$H$_{2v}$)— may be straight or branched, for example, may be, for example, —CH$_2$CH$_2$—, —CH$_2$CH$_2$CH$_2$—, —CH(CH$_3$)—, —CH(CH$_3$)CH$_2$—.

X$^{1a}$ group may be substituted with one or more substituents selected from a C$_{1-3}$ alkyl group.

In another embodiment, examples of X$^{1a}$ include, for example, the following groups:

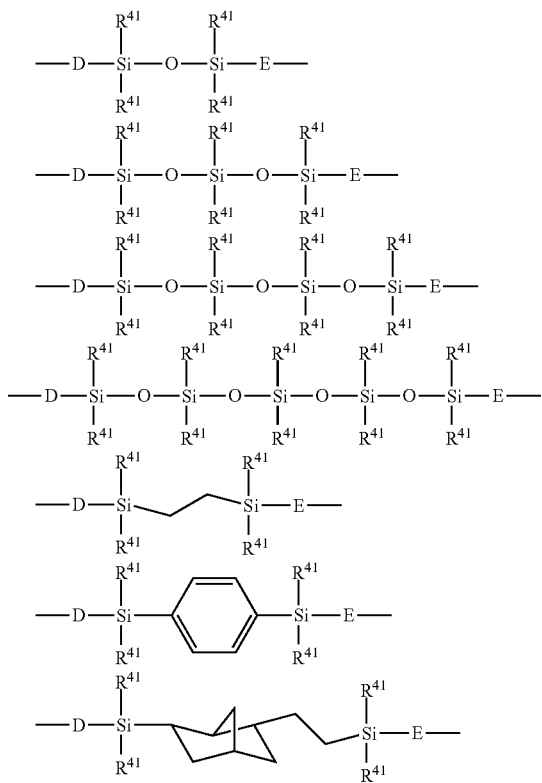

wherein R$^{41}$ is each independently a hydrogen atom, a phenyl group, an alkyl group having 1-6 carbon atoms, or a C$_{1-6}$ alkoxy group, preferably a methyl group;

D is a group selected from:
—CH$_2$O(CH$_2$)$_2$—,
—CH$_2$O(CH$_2$)$_3$—,
—CF$_2$O(CH$_2$)$_3$—,
—(CH$_2$)$_2$—,
—(CH$_2$)$_3$—,
—(CH$_2$)$_4$—,
—CONH—(CH$_2$)$_2$—,
—CONH—(CH$_2$)$_3$—,
—CONH—(CH$_2$)$_4$—,
—CO—(CH$_2$)$_2$—,
—CO—(CH$_2$)$_3$—,
—CO—(CH$_2$)$_4$—,
—CON(CH$_3$)—(CH$_2$)$_3$—,
—CON(Ph)-(CH$_2$)$_3$— (wherein Ph is a phenyl group), and

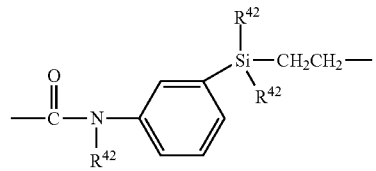

wherein R$^{42}$ is each independently a hydrogen atom, a C$_{1-6}$ alkyl group, or a C$_{1-6}$ alkoxy group, preferably a methyl group or a methoxy group, more preferably a methyl group, E is —(CH$_2$)$_n$— wherein n is an integer of 2-6, and D binds to PE$^2$ of the main backbone, and E binds to Si atom.

Specific examples of X$^{1a}$ include, for example:
—CONH—(CH$_2$)$_2$—,
—CONH—(CH$_2$)$_3$—,
—CONH—(CH$_2$)$_4$—,
—CO—(CH$_2$)$_2$—,
—CO—(CH$_2$)$_3$—,
—CO—(CH$_2$)$_4$—,
—CH$_2$O(CH$_2$)$_2$—,
—CH$_2$O(CH$_2$)$_3$—,
—CH$_2$O(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$OSi(CH$_3$)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—,
—CH$_2$O(CH$_2$)$_3$Si(CH$_3$)$_2$O(Si(CH$_3$)$_2$O)$_2$OSi(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—
—CH$_2$OCH$_2$(CH$_2$)$_7$CH$_2$Si(OCH$_3$)$_2$OSi(OCH$_3$)$_2$(CH$_2$)$_2$Si(OCH$_3$)$_2$OSi(OCH$_3$)$_2$(CH$_2$)$_2$—,
—CH$_2$OCH$_2$CH$_2$CH$_2$Si(OCH$_3$)$_2$OSi(OCH$_3$)$_2$(CH$_2$)$_3$—,
—(CH$_2$)$_2$)—,
—(CH$_2$)$_3$—,
—CONH—(CH$_2$)$_3$—,
—CON(CH$_3$)—(CH$_2$)—,
—CON(Ph)-(CH$_2$)$_3$— (wherein Ph is phenyl),
—CONH—(CH$_2$)$_6$—,
—CON(CH$_3$)—(CH$_2$)$_6$—,
—CON(Ph)-(CH$_2$)$_6$— (wherein Ph is phenyl),
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—(CH$_2$)$_2$S(CH$_2$)$_3$—, —CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—
—C(O)O—(CH$_2$)$_3$—,
—C(O)O—(CH$_2$)$_6$—,
—CH$_2$—O—(CH$_2$)$_3$Si(CH$_3$)$_2$—(CH$_2$)$_2$—Si(CH$_3$)$_2$—(CH$_2$)$_2$—,
—CH$_2$—O—(CH$_2$)$_3$Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,

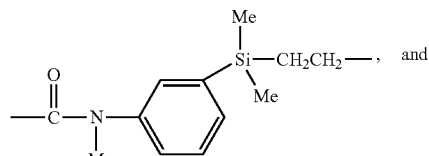

and

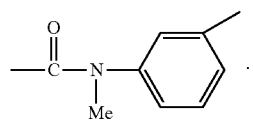

In further another embodiment, X may be $X^{1b}$. Examples of $X^{1b}$ include the following groups:

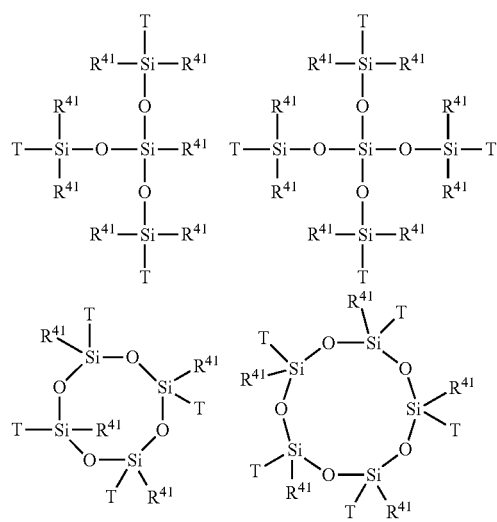

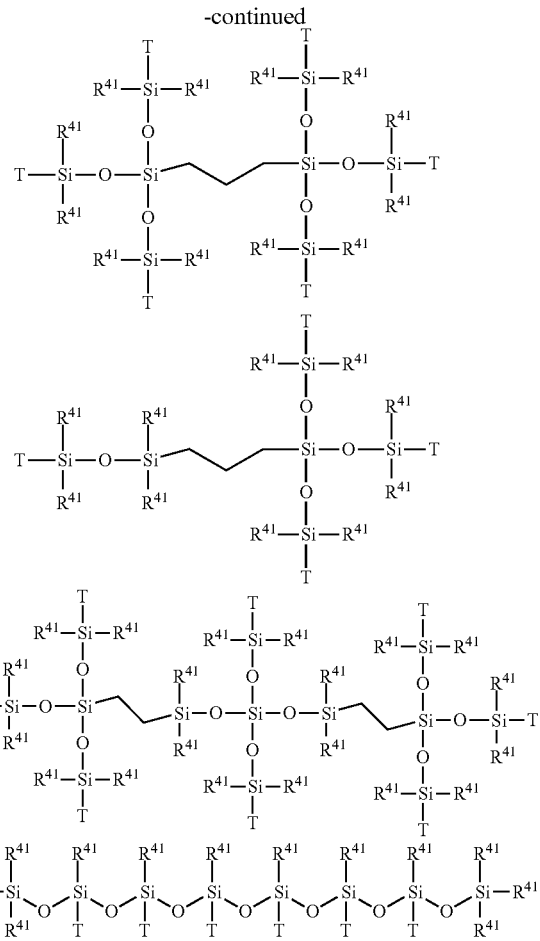

wherein $R^{41}$ is each independently a hydrogen atom, a phenyl group, an alkyl group having 1-6 carbon atoms, or a $C_{1-6}$ alkoxy group, preferably a methyl group;

in each $X^1$, some of T are the following group which binds to PFPE of the main backbone:
—CH$_2$O(CH$_2$)$_2$—,
—CH$_2$O(CH$_2$)$_3$—,
—CF$_2$O(CH$_2$)$_3$—,
—(CH$_2$)$_2$—,
—(CH$_2$)$_3$—,
—(CH$_2$)$_4$—,
—CONH—(CH$_2$)$_2$—,
—CONH—(CH$_2$)$_3$—,
—CONH—(CH$_2$)$_4$—,
—CO—(CH$_2$)$_2$—,
—CO—(CH$_2$)$_3$—,
—CO—(CH$_2$)$_4$—,
—CON(CH$_3$)—(CH$_2$)$_3$—,
—CON(Ph)-(CH$_2$)$_3$— (wherein Ph is phenyl), or

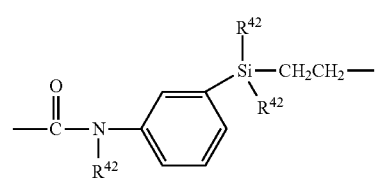

wherein $R^{42}$ is each independently a hydrogen atom, a $C_{1-6}$ alkyl group, or a $C_{1-6}$ alkoxy group, preferably a methyl group or a methoxy group, more preferably a methyl group, some of the other T are —$(CH_2)_{n''}$— (wherein n″ is an integer of 2-6) attached to a Si atom, and the others T are each independently a methyl group, a phenyl group, or a $C_{1-6}$ alkoxy, if present.

In this embodiment, $X^{1a}$ may be a 3-10 valent organic group. In this embodiment, two or more silane moieties ($SiR^a_k R^b_l R^c_m$) which is a binding site to the base material may be present. By applying such structure, friction durability of the surface treating layer can be increased.

In further another embodiment, X may be $X^2$.

$X^2$ is a group of —CONH—$R^{61}$—$R^{62}(R^{61}$—NHCO—$R^{63})_{\beta-1}$ wherein:

$R^{61}$ is each independently a divalent hydrocarbon group;

$R^{62}$ is a β valent organic group;

β is an integer of 2-6;

$R^{63}$ is —O—$R^{67}(OR^{68})_s(O$—$X^{1a}$—$)_t$;

$R^{67}$ is a γ valent organic group;

γ is an integer of 2-8;

$R^{68}$ is a hydrogen atom or an alkyl group having 1-6 carbon atoms;

$X^{1a}$ is a divalent organic group and is as defined above for $X^{1a}$;

s is an integer of 0-6;

t is an integer of 1-7; and the sum of s and t is γ-1.

$R^{61}$ is preferably each independently an alkylene group having 1-10 carbon atoms, a cycloalkylene group having 3-10 carbon atoms or an arylene group having 3-10 carbon atoms, which may have a substituent, more preferably an alkylene group having 1-10 carbon atoms, for example, an alkylene group having 3-8 carbon atoms, which may have a substituent.

$R^{62}$ is preferably a 2-6 valent aliphatic hydrocarbon group, alicyclic hydrocarbon group, aliphatic heterocyclic group, aromatic group or aromatic heterocyclic group, which may have a substituent.

In a preferably embodiment, β is 3-6, that is, $R^{62}$ is 3-6 valent. In this embodiment, two or more Si moieties having a hydrolyzable group ($SiR^a_k R^b_l R^c_m$) which is a binding site to a base material may be present. By applying such structure, friction durability of the surface treating layer can be increased.

In $X^2$, a moiety which is other than $R^{63}$ (i.e., —CONH—$R^{61}$—$R^{62}(R^{61}$—NHCO—$)_{\beta-1}$) can be understood as polyfunctional isocyanate residue, and has for example, the following structure.

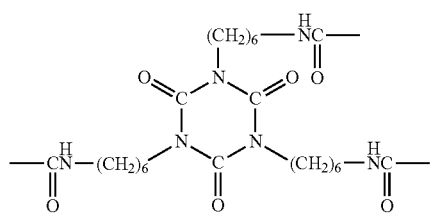

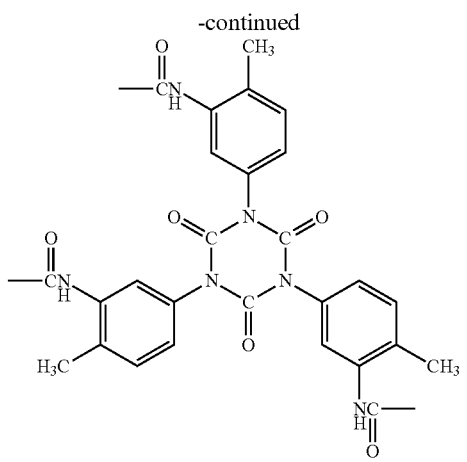

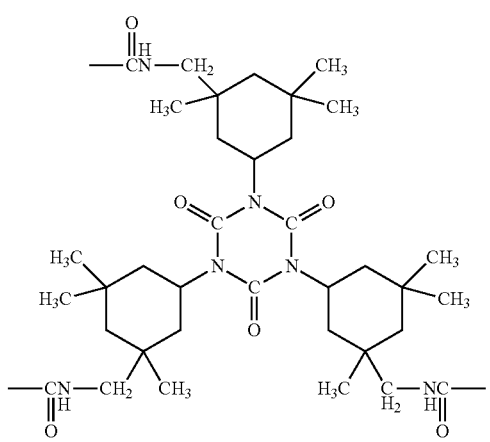

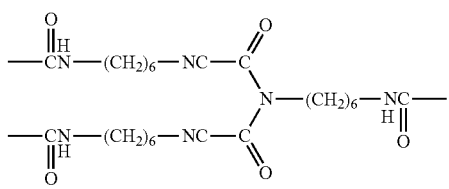

$R^{67}$ is preferably 2-8 valent aliphatic hydrocarbon group, alicyclic hydrocarbon group, aliphatic heterocyclic group, aromatic group or aromatic heterocyclic group, which may have a substituent.

In a preferably embodiment, γ is 3-8, that is, $R^{67}$ is 3-8 valent. In this embodiment, two or more Si moieties having a hydrolyzable group ($SiR^a_k R^b_l R^c_m$) which is a binding site to the base material may be present. By applying such structure, friction durability of the surface treating layer can be increased.

In $R^{63}$, a moiety other than $X^{1a}$ (i.e., —O—$R^{67}(OR^{68})_s$ (O—$)_t$) can be understood as polyol residue, and has for example, the following structure.

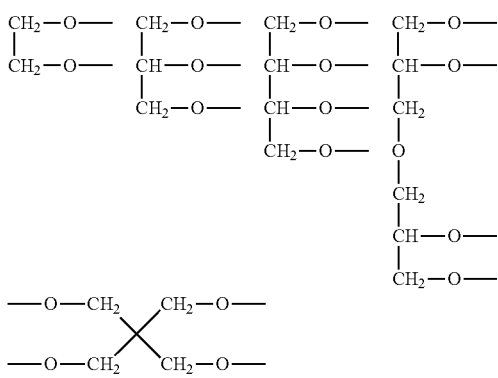

$R^{68}$ is a hydrogen atom or an alkyl group having 1-6 carbon atoms, for example, a methyl group or an ethyl group, preferably a hydrogen atom.

s is an integer of 0-6, preferably an integer of 0-3, more preferably 0 or 1, further preferably 0.

In a preferably embodiment, $X^2$ is a group of the following formula:

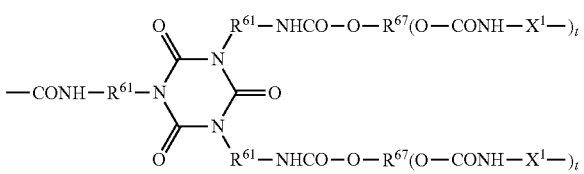

wherein $R^{61}$, $R^{67}$, $X^1$ and t are as defined above.

In this embodiment, $R^{61}$ is preferably an alkylene group having 1-8 carbon atoms, a cycloalkylene group having 5-8 carbon atoms or a phenylene group, which may have a substituent. Examples of the above substituent include preferably an alkyl group having 1-6 carbon atoms, more preferably a methyl group or an ethyl group, further preferably a methyl group.

In this embodiment, $R^{67}$ may be a 2-6 valent, preferably 2-4 valent, more preferably 2 valent or 3 valent hydrocarbon having 2-6 carbon atoms. Preferably, $R^{67}$ may be the following group.

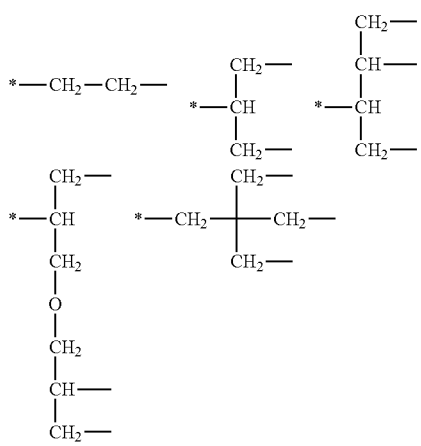

wherein a bond marked with * binds to the isocyanurate ring side.

In this embodiment, $X^1$ is preferably an alkylene group having 1-8 carbon atoms, more preferably an alkylene group having 2-6 carbon atoms.

In one embodiment, X is each independently a 3-10 valent organic group, α is each independently an integer of 2-9. In this embodiment, preferably all units in parentheses with a contain a Si atom to which a hydroxyl group or a hydrolyzable group binds. By applying such structure, friction durability of the surface treating layer can be increased.

In the above formula, $R^a$ is each independently at each occurrence $—Z—SiR^{71}_p R^{72}_q R^{73}_r$.

In the formula, Z is each independently at each occurrence an oxygen atom or a divalent organic group.

Z is preferably a $C_{1-6}$ alkylene group, $—(CH_2)_g—O—(CH_2)_h—$ wherein g is an integer of 1-6, h is an integer of 1-6 or -phenylene-$(CH_2)_i—$ wherein i is an integer of 0-6, more preferably a $C_{1-3}$ alkylene group. The groups may be substituted by one or more substituents selected from for example, a fluorine atom, a $C_{1-6}$ alkyl group, a $C_{2-6}$ alkenyl group, and a $C_{2-6}$ alkynyl group.

In the formula, $R^{71}$ is each independently at each occurrence $R^{a'}$. $R^{a'}$ is as defined for $R^a$.

In $R^a$, the number of Si atoms which are linearly connected via Z is up to five. That is, in $R^a$, when there is at least one $R^{71}$, there are two or more Si atoms which are linearly connected via Z in $R^a$. The number of such Si atoms which are linearly connected via Z is five at most. It is noted that "the number of such Si atoms which are linearly connected via Z in $R^a$ is equal to the repeating number of $—Z—Si—$ which are linearly connected in $R^a$.

For example, one example in which Si atoms are connected via Z in $R^a$ is shown below.

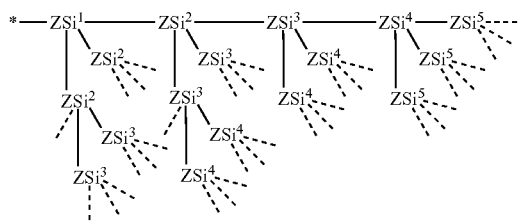

In the above formula, * represents a position binding to Si of the main backbone, and . . . represents that a predetermined group other than ZSi binds thereto, that is, when all three bonds of a Si atom are . . . , it means an end point of the repeat of ZSi. The number on the right shoulder of Si means the number of occurrences of Si which is linearly connected via the Z group from *. In other words, in the chain in which the repeat of ZSi is completed at $Si^2$, "the number of such Si atoms which are linearly connected via the Z group in $R^{a'''}$ is 2. Similarly, in the chain in which the repeat of ZSi is completed at $Si^3$, $Si^4$ and $Si^5$, respectively, "the number of such Si atoms which are linearly connected via the Z group in $R^{a'''}$ is 3, 4 and 5. It is noted that as seen from the above formula, there are some ZSi chains, but they need not have the same length and may be have arbitrary length.

In a preferred embodiment, as shown below, "the number of such Si atoms which are linearly connected via the Z group in $R^{a'''}$ is 1 (left formula) or 2 (right formula) in all chains.

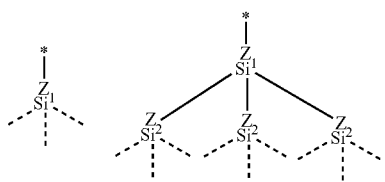

In one embodiment, the number of such Si atoms which are linearly connected via the Z group in $R^a$ is 1 or 2, preferably 1.

In the formula, $R^{72}$ is each independently at each occurrence a hydroxyl group or a hydrolyzable group.

The "hydrolyzable group" as used herein represents a group which is able to undergo a hydrolysis reaction. Examples of the hydrolyzable group include —OR, —OCOR, —O—N═C(R)$_2$, —N(R)$_2$, —NHR, halogen (wherein R is a substituted or non-substituted alkyl group having 1-4 carbon atoms), preferably —OR (an alkoxy group). Examples of R include a non-substituted alkyl group such as a methyl group, an ethyl group, a propyl group, an isopropyl group, a n-butyl group, an isobutyl group; a substituted alkyl group such as a chloromethyl group. Among them, an alkyl group, in particular a non-substituted alkyl group is preferable, a methyl group or an ethyl group is more preferable. The hydroxyl group may be, but is not particularly limited to, a group generated by hydrolysis of a hydrolyzable group.

Preferably, $R^{72}$ is —OR wherein R is a substituted or unsubstituted $C_{1-3}$ alkyl group, more preferably a methyl group.

In the formula, $R^{73}$ is each independently at each occurrence a hydrogen atom or a lower alkyl group. The lower alkyl group is preferably an alkyl group having 1-20 carbon atoms, more preferably an alkyl group having 1-6 carbon atoms, further preferably a methyl group.

In the formula, p is each independently at each occurrence an integer of 0-3; q is each independently at each occurrence an integer of 0-3; and r is each independently at each occurrence an integer of 0-3. The sum of p, q and r is 3.

In a preferable embodiment, in $R^{a'}$ at the end of $R^a$ ($R^a$ when $R^{a'}$ is absent), q is preferably 2 or more, for example, 2 or 3, more preferably 3.

In the above formula, $R^b$ is each independently at each occurrence a hydroxyl group or a hydrolyzable group.

The "hydrolyzable group" is as defined in $R^{72}$, and preferably —OR, —OCOR, —O—N═C(R)$_2$, —N(R)$_2$, —NHR, halogen (wherein R is a substituted or unsubstituted alkyl group having 1-4 carbon atoms), more preferably —OR. R is an unsubstituted alkyl group such as a methyl group, an ethyl group, a propyl group, an isopropyl group, a n-butyl group, an isobutyl group; a substituted alkyl group such as a chloromethyl group. Among them, an alkyl group, in particular unsubstituted alkyl group is preferable, and a methyl group or an ethyl group is more preferable. The hydroxyl group may be, but is not particularly limited to, a group generated by hydrolysis of a hydrolyzable group. More preferably, $R^b$ is —OR wherein R is a substituted or unsubstituted $C_{1-3}$ alkyl group, more preferably a methyl group.

In the above formula, $R^c$ is each independently at each occurrence a hydrogen atom or a lower alkyl group. The lower alkyl group is preferably an alkyl group having 1-20 carbon atoms, more preferably an alkyl group having 1-6 carbon atoms, further preferably a methyl group.

In the formula, k is each independently at each occurrence an integer of 0-3; l is each independently at each occurrence an integer of 0-3; m is each independently at each occurrence an integer of 0-3. The sum of k, l and m is 3.

In a preferably embodiment, k is 1-3, more preferably 2 or 3, further preferably 3. That is, $R^a$ is present. In this embodiment, two or more Si moieties having a hydrolyzable group which is a binding site to a base material may be present. By applying such structure, friction durability of the surface treating layer can be increased.

In the compound of the present invention, when X is a divalent organic group, k is 1-3, more preferably 2 or 3, further preferably 3. That is, $R^a$ is present. In this embodiment, the unit in parentheses with a contains two or more Si atoms to which a hydroxyl group or a hydrolyzable group binds. By applying such structure, friction durability of the surface treating layer can be increased.

A number average molecular weight of the (poly)ether group containing silane compound of the present invention is preferably 200 or more, more preferably 500 or more, preferably 10,000 or less, more preferably 5,000 or less, further preferably 2,000 or less. By having such number average molecular weight, visibility of fingerprints adhered to a base material becomes lower, and adhered fingerprints can easily become invisible (or the visibility can be more reduced), for example, by wiping the adhered fingerprint.

A number average molecular weight of a polyether moiety ($PE^1$ group) of the (poly)ether group containing silane compound of the present invention may be, but not particularly limited, preferably 200 or more, more preferably 500 or more, preferably 10,000 or less, more preferably 5,000 or less, further preferably 2,000 or less. By $PE^1$ having such number average molecular weight, visibility of fingerprints adhered to a base material becomes lower, and adhered fingerprints can easily become invisible, for example, by wiping the adhered fingerprint.

In the present invention, the "number average molecular weight" is measured by GPC (Gel Permeation Chromatography) analysis.

The (poly)ether group containing silane compound of the present invention has a glass transition temperature (Tg) of preferably −70° C. or more, preferably 40° C. or less, more preferably 30° C. or less, further preferably 20° C. or less. By having such glass transition temperature, visibility of fingerprints adhered to a base material becomes lower, and adhered fingerprints can easily become lower by wiping the adhered fingerprint.

In the present invention, the "glass transition temperature" is measured by differential scanning calorimeter.

The compound of the present invention has two or more silane moieties having a hydroxyl group or a hydrolyzable group which is a binding site to a base material on at least one end of the polyether group. Therefore, it is considered that the compound can bind strongly to a base material, and high friction durability can be achieved.

The (poly)ether group containing silane compound of the formulae (A1) and (A2) can be prepared by the known method.

For example, the compound can be obtained by reacting a polyether group containing dialcohol corresponding $PE^1$ and $PE^2$ with a diisocianate group corresponding Y to prepare $R^1$—$(PE^1\text{-}Y)_n$—$PE^2$-H, and then reacting an OH group at the end of $R^1$—$(PE^1\text{-}Y)_n$—$PE^2$-H with a silane compound having an isocyanate group corresponding to —X—SiR$^a_k$R$^b_l$R$^c_m$.

A reaction condition for preparing the (poly)ether group containing silane compound of the present invention can be appropriately selected by those skilled in the art.

Next, the surface-treating agent of the present invention is described.

The surface-treating agent of the present invention contains at least one (poly)ether group containing silane compound of the formula (A1) or formula (A2).

The surface-treating agent of the present invention can provide a base material with hydrophilicity, lipophilicity, antifouling property, surface slip property, wiping-off property and friction durability depending on its structure.

In particular, the surface treating layer formed form the surface-treating agent containing the compound of the present invention on a base material has high lipophilicity. That is, the surface-treating agent containing the compound of the present invention can form a surface treating layer having a contact angle ton-hexadecane of preferably 40° or less, more preferably 30° or less, further preferably 25° or less, and preferably 10° or more, more preferably 15° or more. Therefore, even when the fingerprint is adhered, the visibility of the contact angle is low and the fingerprint is inconspicuous since the contact angle is low.

In addition, the surface treating layer formed form the surface-treating agent containing the compound of the present invention on a base material has high surface slip property. That is, the surface-treating agent containing the compound of the present invention can form a surface treating layer having a coefficient of kinetic friction of preferably 0.30 or less, more preferably 0.25 or less, further preferably 0.20 or less, more preferably 0.15 or less, further preferably 0.10 or less.

In one embodiment, the surface-treating agent of the present invention comprises at least one (poly)ether group containing silane compound of the formula (A1).

The surface treating agent may be diluted with a solvent. General purpose solvents can be used as the solvent can be used. Examples of the solvent contained in the surface-treating agent of the present invention include, but are not particularly limited to, for example, acetone, methylethylketone, methylisobutylketone, cyclohexanone, propyleneglycol monomethyl ether, propyleneglycol monoethyl ether, propyleneglycol monobutyl ether, propyleneglycol monomethyl ether acetate, propyleneglycol monomethyl ethyl ether acetate, propyleneglycol monobutyl ether acetate, dipropyleneglycol dimethyl ether pentane, hexane, heptane, octane, dichloromethane, chloroform, carbon tetrachloride, dichloroethane, carbon disulfide, benzene, toluene, xylene, nitrobenzene, diethyl ether, dimethoxyethane, diglyme, triglyme, ethyl acetate, butyl acetate, dimethylformamide, dimethylsulfoxide, acetonitrile, benzonitrile, butanol, 1-propanol, 2-propanol, ethanol, methanol, and diacetone alcohol. These solvents may be used alone or as a mixture of 2 or more compound.

The surface treating agent may comprise other components in addition to the (poly)ether group containing silane compound. Examples of the other components include, but are not particularly limited to, for example, polyol, catalyst, or the like.

The polyol may be a compound of the following formula:

HO—$(C_aH_{2a}O)_{b'}$—OH wherein:

a' is an integer of 1-6 each independently per a units in parentheses with b'; and b' is each independently at each occurrence an integer of 1-300.

The polyol may be a block polymer or a random polymer. By adding the polyol, more excellent surface slip property, friction durability, property of reducing visibility of fingerprint after wiping off can be obtained.

In a preferably embodiment, —$(C_aH_{2a}O)_{b'}$— is a group of the following formula:

—$(C_4H_8O)_{c'}$—$(C_3H_6O)_{d'}$—$(C_2H_4O)_{e'}$— wherein:

c', d' and e' are each independently at each occurrence an integer of 0-300, for example, an integer of 1-300, preferably an integer of 5-200, more preferably an integer of 10-100;

the sum of c', d' and e' is 1-200, preferably 5-200, more preferably 10-100; and the occurrence order of the respective repeating units in parentheses with the subscript c', d' or e' is not limited in the formula.

In another embodiment, —$(C_aH_{2a}O)_{b'}$— is a group selected from the following formula:

—$(C_4H_8O)_{c'}$—

—$(C_3H_6O)_{d'}$—, and

—$(C_2H_4O)_{e'}$— wherein c', d' and e' are each independently an integer of 1-300, preferably an integer of 5-200, more preferably an integer of 10-100.

A number average molecular weight of the polyol may be preferably 1,000-30,000, more preferably 5,000-20,000, for example, 8,000-20,000 or 10,000-20,000.

In the surface-treating agent of the present invention, the polyol may be contained for example, 0-500 parts by mass, preferably 0-400 parts by mass, more preferably 25-400 parts by mass with respect to 100 parts by mass of the polyether group containing silane compound (as the total mass when two or more compounds are used; hereinafter the same shall apply).

In a preferable embodiment, when a surface-treating layer is formed by using vacuum deposition, a number average molecular weight of the polyol may be higher than a number average molecular weight of the compound of the formula (A1) or (A2). By selecting such number average molecular weights of the compound of the formula (A1) or (A2) and the polyol, more excellent surface slip property and friction durability can be obtained.

Examples of the above-mentioned catalyst include an acid (for example, acetic acid, trifluoroacetic acid, etc.), a base (for example, ammonia, triethylamine, diethylamine, etc.), a transition metal (for example, Ti, Ni, Sn, etc.), and the like.

The catalyst facilitates hydrolysis and dehydration-condensation of the (poly)ether group containing silane compound to facilitate a formation of the surface-treating layer.

The surface-treating agent of the present invention is impregnated into a porous material, for example, a porous ceramic material, a metal fiber for example that obtained by solidifying a steel wool to obtain a pellet. The pellet can be used, for example, in vacuum deposition.

Next, the article of the present invention will be described.

The article of the present invention comprises a base material and a layer (surface-treating layer) which is formed from the surface-treating agent of the present invention on the surface of the base material. This article can be produced, for example, as follows.

Firstly, the base material is provided. The base material usable in the present invention may be composed of any suitable material such as a glass, a sapphire glass, a resin (may be a natural or synthetic resin such as a common plastic material, and may be in form of a plate, a film, or others), a metal (may be a simple substance of a metal such as aluminum, copper, or iron, or a complex such as alloy or the like), a ceramic, a semiconductor (silicon, germanium, or the like), a fiber (a fabric, a non-woven fabric, or the like), a fur, a leather, a wood, a pottery, a stone, an architectural member or the like. The base material is preferably a glass or a sapphire glass.

As the glass, a soda-lime glass, an alkali aluminosilicate glass, a borosilicate glass, a non-alkaline glass, a crystal glass, a quartz glass is preferable, a chemically strengthened soda-lime glass, a chemically strengthened alkali aluminosilicate glass, and a chemically strengthened borosilicate glass are more preferable.

As the resin, an acrylic resin or a polycarbonate resin are preferable.

For example, when an article to be produced is an optical member, a material constituting the surface of the base material may be a material for an optical member, for example, a glass or a transparent plastic. For example, when an article to be produced is an optical member, any layer (or film) such as a hard coating layer or an antireflection layer may be formed on the surface (outermost layer) of the base material. As the antireflection layer, either a single antireflection layer or a multi antireflection layer may be used. Examples of an inorganic material usable in the antireflection layer include $SiO_2$, SiO, $ZrO_2$, $TiO_2$, TiO, $Ti_2O_3$, $Ti_2O_5$, $Al_2O_3$, $Ta_2O_5$, $CeO_2$, MgO, $Y_2O_3$, $SnO_2$, $MgF_2$, $WO_3$, and the like. These inorganic materials may be used alone or in combination with two or more (for example, as a mixture). When multi antireflection layer is formed, preferably, $SiO_2$ and/or SiO are used in the outermost layer. When an article to be produced is an optical glass part for a touch panel, it may have a transparent electrode, for example, a thin layer comprising indium tin oxide (ITO), indium zinc oxide, or the like on a part of the surface of the base material (glass). Furthermore, the base material may have an insulating layer, an adhesive layer, a protecting layer, a decorated frame layer (I-CON), an atomizing layer, a hard coating layer, a polarizing film, a phase difference film, a liquid crystal display module, and the like, depending on its specific specification.

The shape of the base material is not specifically limited. The region of the surface of the base material on which the surface-treating layer should be formed may be at least a part of the surface of the base material, and may be appropriately determined depending on use, the specific specification, and the like of the article to be produced.

The base material may be that of which at least the surface consists of a material originally having a hydroxyl group. Examples of such material include a glass, in addition, a metal on which a natural oxidized film or a thermal oxidized film is formed (in particular, a base metal), a ceramic, a semiconductor, and the like. Alternatively, as in a resin, when the hydroxyl groups are present but not sufficient, or when the hydroxyl group is originally absent, the hydroxyl group can be introduced on the surface of the base material, or the number of the hydroxyl group can be increased by subjecting the base material to any pretreatment. Examples of the pretreatment include a plasma treatment (for example, corona discharge) or an ion beam irradiation. The plasma treatment may be suitably used to introduce the hydroxyl group into or increase it on the surface of the base material, further, to clarify the surface of the base material (remove foreign materials, and the like). Alternatively, other examples of the pretreatment include a method wherein a monolayer of a surface adsorbent having a carbon-carbon unsaturated bond group is formed on the surface of the base material by using a LB method (Langmuir-Blodgett method) or a chemical adsorption method beforehand, and then, cleaving the unsaturated bond under an atmosphere of oxygen and nitrogen.

Alternatively, the base material may be that of which at least the surface consists of a material comprising other reactive group such as a silicon compound having one or more Si—H groups or alkoxysilane.

Next, the film of the above surface-treating agent of the present invention is formed on the surface of the base material, and the film is post-treated, as necessary, and thereby the surface-treating layer is formed from the surface-treating agent.

The formation of the film of the surface-treating agent of the present invention can be performed by applying the above surface-treating agent on the surface of the base material such that the surface-treating agent coats the surface. The method of coating is not specifically limited. For example, a wet coating method or a dry coating method can be used.

Examples of the wet coating method include dip coating, spin coating, flow coating, spray coating, roll coating, gravure coating, and a similar method.

Examples of the dry coating method include deposition (usually, vacuum deposition), sputtering, CVD and a similar method. The specific examples of the deposition method (usually, vacuum deposition) include resistance heating, electron beam, high-frequency heating using microwave, etc., ion beam, and a similar method. The specific examples of the CVD method include plasma-CVD, optical CVD, thermal CVD and a similar method. The deposition method is will be described below in more detail.

Additionally, coating can be performed by an atmospheric pressure plasma method.

When the wet coating method is used, the surface-treating agent of the present invention is diluted with a solvent, and then it is applied to the surface of the base material. In view of stability of the surface-treating agent of the present invention and volatile property of the solvent, the following solvents are preferably used: acetone, methylethylketone, methylisobutylketone, cyclohexanone, propyleneglycol monomethyl ether, propyleneglycol monoethyl ether, propyleneglycol monobutyl ether, propyleneglycol monomethyl ether acetate, propyleneglycol monomethyl ethyl ether acetate, propyleneglycol monobutyl ether acetate, dipropyleneglycol dimethyl ether pentane, hexane, heptane, octane, dichloromethane, chloroform, carbon tetrachloride, dichloroethane, carbon disulfide, benzene, toluene, xylene, nitrobenzene, diethyl ether, dimethoxyethane, diglyme, triglyme, ethyl acetate, butyl acetate, dimethylformamide, dimethylsulfoxide, acetonitrile, benzonitrile, butanol, 1-propanol, 2-propanol, ethanol, methanol, and diacetone alcohol. These solvents may be used alone or as a mixture of 2 or more compound. Furthermore, the solvent can be mixed with another solvent, for example, to adjust solubility of the (poly)ether group containing silane compound.

When the dry coating method is used, the surface-treating agent of the present invention may be directly subjected to the dry coating method, or may be diluted with a solvent, and then subjected to the dry coating method.

The formation of the film is preferably performed so that the surface-treating agent of the present invention is present together with a catalyst for hydrolysis and dehydration-condensation in the coating. Simply, when the wet coating method is used, after the surface-treating agent of the present invention is diluted with a solvent, and just prior to applying it to the surface of the base material, the catalyst may be added to the diluted solution of the surface-treating agent of the present invention.

When the dry coating method is used, the surface-treating agent of the present invention to which a catalyst has been added is used itself in deposition (usually, vacuum deposition), or pellets may be used in the deposition (usually, the vacuum deposition), wherein the pellets is obtained by impregnating a porous metal such as iron or copper with the surface-treating agent of the present invention to which the catalyst has been added.

As the catalyst, any suitable acid or base can be used. As the acid catalyst, for example, acetic acid, formic acid, trifluoroacetic acid, or the like can be used. As the base catalyst, for example, ammonia, an organic amine, or the like can be used.

Next, the film is post-treated as necessary. This post-treatment is, but not limited to, a treatment in which water supplying and dry heating are sequentially performed, in more particular, may be performed as follows.

After the film of the surface-treating agent of the present invention is formed on the surface of the base material as mentioned above, water is supplied to this film (hereinafter, referred to as precursor coating). The method of supplying water may be, for example, a method using dew condensation due to the temperature difference between the precursor coating (and the base material) and ambient atmosphere or spraying of water vapor (steam), but not specifically limited thereto.

It is considered that, when water is supplied to the precursor coating, water acts on a hydrolyzable group bonding to Si present in the perfluoro(poly)ether group containing silane compound in the surface-treating agent of the present invention, thereby enabling rapid hydrolysis of the compound.

The supplying of water may be performed under an atmosphere, for example, at a temperature of 0-250° C., preferably 60° C. or more, more preferably 100° C. or more and preferably 180° C. or less, more preferably 150° C. By supplying water at such temperature range, hydrolysis can proceed. The pressure at this time is not specifically limited but simply may be ambient pressure.

Then, the precursor coating is heated on the surface of the base material under a dry atmosphere over 60° C. The method of dry heating may be to place the precursor coating together with the base material in an atmosphere at a temperature over 60° C., preferably over 100° C., and for example, of 250° C. or less, preferably of 180° C. or less, and at unsaturated water vapor pressure, but not specifically limited thereto. The pressure at this time is not specifically limited but simply may be ambient pressure.

Under such atmosphere, between the (poly)ether groups containing silane compound of the present inventions, the groups bonding to Si after hydrolysis are rapidly dehydration-condensed with each other. Furthermore, between the compound and the base material, the group bonding to Si in the compound after hydrolysis and a reactive group present on the surface of the base material are rapidly reacted, and when the reactive group present on the surface of the base material is a hydroxyl group, dehydration-condensation is caused. As the result, the bond between the perfluoro(poly) ether group containing silane compound and the base material is formed.

The above supplying of water and dry heating may be sequentially performed by using a superheated water vapor.

The superheated water vapor is a gas which is obtained by heating a saturated water vapor to a temperature over the boiling point, wherein the gas, under an ambient pressure, has become to have a unsaturated water vapor pressure by heating to a temperature over 100° C., generally of 500° C. or less, for example, of 300° C. or less, and over the boiling point. In the present invention, in view of suppressing decomposition of the perfluoro(poly)ether group containing silane compound, the superheated water vapor of preferably 250° C. or less, preferably 180° C. or less is used in the supplying of water and dry heating. When the base material on which the precursor coating is formed is exposed to a superheated water vapor, firstly, due to the temperature difference between the superheated water vapor and the precursor coating of a relatively low temperature, dew condensation is generated on the surface of the precursor coating, thereby supplying water to the precursor coating. Presently, as the temperature difference between the superheated water vapor and the precursor coating decreases, water on the surface of the precursor coating is evaporated under the dry atmosphere of the superheated water vapor, and an amount of water on the surface of the precursor coating gradually decreases. During the amount of water on the surface of the precursor coating is decreasing, that is, during the precursor coating is under the dry atmosphere, the precursor coating on the surface of the base material contacts with the superheated water vapor, as a result, the precursor coating is heated to the temperature of the superheated water vapor (temperature over 100° C. under ambient pressure). Therefore, by using a superheated water vapor, supplying of water and dry heating are enabled to be sequentially carried out simply by exposing the base material on which the precursor coating is formed to a superheated water vapor.

As mentioned above, the post-treatment can be performed. It is noted that though the post-treatment may be performed in order to further increase friction durability, it is not essential in the producing of the article of the present invention. For example, after applying the surface-treating agent to the surface of the base material, it may be enough to only stand the base material.

As described above, the surface-treating layer derived from the film of the surface-treating agent of the present invention is formed on the surface of the base material to produce the article of the present invention. The surface-treating layer thus formed has high friction durability. Furthermore, this surface-treating layer can reduce the visibility of adhered fingerprint and may have water-repellency, oil-repellency, antifouling property (for example, preventing from adhering a fouling such as fingerprints), waterproof property (preventing the ingress of water into an electrical member, and the like), surface slip property (or lubricity, for example, wiping property of a fouling such as fingerprints and excellent tactile feeling in a finger) depending on a composition of the surface-treating agent used, in addition to high friction durability. Therefore, the surface-treating layer may be suitably used as a functional thin film.

The article having the surface-treating layer obtained according to the present invention is not specifically limited to, but may be an optical member. Examples of the optical member include the followings: displays such as a cathode ray tube (CRT; for example, TV, personal computer monitor), a liquid crystal display, a plasma display, an organic EL display, an inorganic thin-film EL dot matrix display, a rear projection display, a vacuum fluorescent display (VFD), a field emission display (FED; Field Emission Display), or a front surface protective plate, an antireflection plate, a polarizing plate, or an anti-glare plate of these display, or these whose surface is subjected to antireflection treatment; lens of glasses, or the like; a touch panel sheet of an instrument such as a mobile phone or a personal digital assistance; a disk surface of an optical disk such as a Blu-ray disk, a DVD disk, a CD-R or MO; an optical fiber, and the like; a display surface of a clock.

Other article having the surface-treating layer obtained according to the present invention may be also a ceramic product, a painted surface, a cloth product, a leather product, a medical product and a plaster.

The article having the surface-treating layer obtained according to the present invention may be also a medical equipment or a medical material.

The thickness of the surface-treating layer is not specifically limited. For the optical member, the thickness of the surface-treating layer is within the range of 1-50 nm, preferably 1-30 nm, more preferably 1-15 nm, in view of optical performance, surface slip property, friction durability and antifouling property.

Hereinbefore, the article produced by using the surface-treating agent of the present invention is described in detail. It is noted that an application, a method for using or a method for producing the article are not limited to the above exemplification.

EXAMPLES

The surface-treating agent of the present invention will be described in detail through Examples, although the present invention is not limited to Examples. It is noted that in Examples, all chemical formulae described below mean an average composition.

Synthesis of Compound

Example 1

Polytetramethylene glycol (molecular weight: 650, 6.5 g) was solved in tetrahydrofuran (10 g), and sodium hydride (0.96 g) was added. Allyl bromide (7.3 g) was added dropwise, and the mixture was stirred at 50 degrees at 3 hours. After cooling to a room temperature, saturated ammonium chloride aqueous solution (70 ml) was added slowly. After separation, the upper layer was collected, the solvents and the unreacted materials were distilled off under reduced pressure. The obtained oil product (5 g) was added dropwise to a mixed solution of toluene (10 g), tetramethylcyclotetrasiloxane (3.6 g), the solution of 1,3-divinyl-1,1,3,3-tetramethyldisiloxane platinum (0) in xylene (0.25 g) (Containing 5 mg as simple Pt), and was stirred at 60 degrees for 3 hours. Then, the solvents and the unreacted materials were distilled off under reduced pressure. The obtained compound (8.5 g), toluene (10 g), vinyl trimethoxysilane (8.3 g), and a solution of 1,3-divinyl-1,1,3,3-tetramethyldisiloxane platinum (0) in xylene (0.25 g) (containing 5 mg as simple Pt) were mixed, and stirred at 60° C. for 5 hours. Then, active carbon (1 g) was added, and stirred for overnight. After filtering activated carbon, the solvents and the unreacted materials were distilled off under reduced pressure to obtain the oil product (13 g). The compound was confirmed to be a compound of the following formula by 1H-NMR.

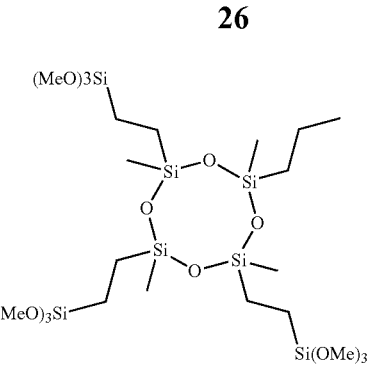

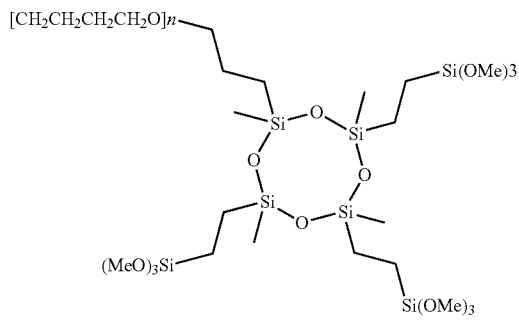

wherein n is about 9.

Example 2

To a four-necked flask provided with a dropping funnel, a stirrer, and a thermometer, glycerin (2.0 g) and ethyl acetate (5 g) were added and the mixture was stirred to homogenize in the system. Then, a mixture of 3-(triethoxysilyl)propylisocyanate (5.74 g) and di-n-butyl tin dilaurate (0.05 g) as a catalyst was added dropwise from the dropping funnel such that [OH]/[NCO] is 3/2, and stirred and reacted at 12 hours at a room temperature. After confirming disappearance of a peak at 2260 cm$^{-1}$ of isocyanate by FT-IR, Sumidule N3300 (manufactured by Sumitomo Chemical Co., Ltd.) which was trifunctional isocyanate (3.56 g) was weighed such that [OH]/[NCO] is 2/3, and dissolved in ethyl acetate of the same weight, and then the mixture was added dropwise, stirred and reacted to obtain a four functional silane compound A having an isocyanate group. Then, obtained silane compound A and polytetramethylene glycol (molecular weight: 650) were mixed such that [OH]/[NCO] is 2/1 to obtain Compound 2 having average four silanes per one molecule. The completion of the reaction was confirmed by observing disappearance of the peak at 2260 cm$^{1}$ of the isocyanate by the FT-IR.

Example 3

Silane compound A and polytetramethylene glycol (molecular weight: 650) were mixed and reacted such that [OH]/[NCO] is 1/1 to obtain Compound 3 having average eight silanes per one molecule (especially, having the following formula). The completion of the reaction was confirmed by observing disappearance of the peak at 2260 cm$^{-1}$ of the isocyanate by the FT-IR.

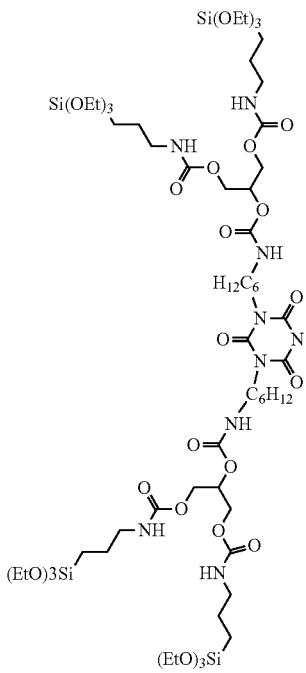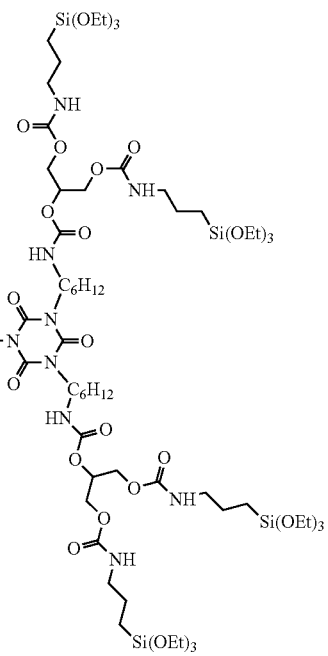

wherein n is about 9.

Comparative Example 1

To a four-necked flask provided with a dropping funnel, a stirrer, and a thermometer, polytetramethylene glycol (molecular weight: 650, 10.0 g) were ethyl acetate (10.0 g) were added, and then stirred and mixed to homogenize in the system. Then, a mixture of 3-(triethoxysilyl)propylisocyanate (3.80 g) and di-n-butyl tin dilaurate (0.05 g) as a catalyst was added dropwise from the dropping funnel and stirred and reacted at 12 hours at a room temperature to obtain Compound 4. The completion of the reaction was confirmed by observing disappearance of the peak at 2260 $cm^{-1}$ of the isocyanate by the FT-IR.

Formation of Surface Treating Layer

Example 4

Compound 1 obtained in Example 1 was dissolved in ethyl acetate so as to obtain an ethyl acetate solution having a concentration of 20 wt % to prepare a surface treating agent. The surface treating agent was vacuum deposited (pressure $3.0\times10^{-3}$ Pa) on a chemical strengthening glass (Gorilla glass manufactured by Corning Incorporated; thickness: 0.7 mm). The surface-treating agent of 2 mg (that is, it contained of 0.4 mg of Compound 1 of Example 1) was vacuum-deposited per one plate of the chemical strengthening glass (55 mm×100 mm). Then, the chemical strengthening glass having the deposited layer was stood under a temperature of 20° C. and a humidity of 65% for 24 hours. As a result, the deposited layer was hardened and the surface treating layer was formed.

Example 5

Similarly to Example 4 except Compound 2 of Example 2 was used in place of the compound of Example 1, the surface-treating agent was prepared and the surface treating layer was formed.

Example 6

Similarly to Example 4 except Compound 3 of Example 3 was used in place of the compound of Example 1, the surface-treating agent was prepared and the surface treating layer was formed.

Comparative Example 2

Similarly to Example 4 except Compound 4 of Comparative Example 1 was used in place of the compound of Example 1, the surface-treating agent was prepared and the surface treating layer was formed.

Experiment 1

Evaluation of Surface Slip Property (Measurement of Coefficient of Dynamic Friction)

Coefficient of dynamic friction of the surface-treating layers formed on the surface of the base material in the above Examples 4-6 and Comparative Examples 3-4 was measured. Specifically, the coefficient of dynamic friction (–) was measured by using a surface texture measurement instrument (FPT-1 manufactured by Labthink Co., Ltd.) using a paper as a friction probe according to ASTM D4917. Specifically, the base material on which the surface-treating layer was formed was horizontally arranged, and then, a friction paper (2 cm×2 cm) was contacted to an exposed surface of the surface-treating layer and a load of 200 gf was applied thereon. Then, the friction paper was parallely moved at a speed of 500 mm/second while applying the load and the coefficient of dynamic friction was measured. The results are shown in Table 1.

Evaluation of Visibility

For the surface-treating layers formed on the surface of the base material in the above Examples 4-6 and Comparative Example 2, visibility and wiping property of adhered fingerprint were evaluated. Specifically, the treated base material to which fingerprint was adhered was placed on an aluminum metal plate, and was exposed to light of a fluorescent lamp at an incident angel of 60 degrees in a dark room, and then appearance of fingerprint adhered to the base material was visually observed at 60 degrees from the opposite side to the light source. The evaluation was performed according to the following three criteria.

1: Adhered fingerprint was not visible.

2: Adhered fingerprint was slightly visible.

3: Adhered fingerprint was clearly visible.

Evaluation of Wiping Fingerprint

For the base material after the fingerprint adhering test, the fingerprint was wiped using Kimwipe with a load of 100 gf, and condition after wiping fingerprint was evaluated visually. The evaluation was performed according to the following 3 criteria.

1: Adhered fingerprint disappeared by the wiping of two or less shuttles.

2: Adhered fingerprint disappeared by the wiping of 3-5 shuttles.

3: Adhered fingerprint remained even after the wiping of 5 shuttles.

Evaluation of Contact Angle

The static contact angle to water and n-heaxadecane (degree) was measured for 1 µL of water by using a contact angle measuring instrument ("DropMaster" manufactured by KYOWA INTERFACE SCIENCE Co., LTD.). The results are shown in Table 1.

TABLE 1

|  | Example 5 | Example 6 | Example 7 | Comparative Example 2 |
| --- | --- | --- | --- | --- |
| COF | 0.17 | 0.1 | 0.11 | 0.09 |
| Adhesion property of fingerprint | 1 | 1 | 1 | 1 |
| Wiping property of fingerprint | 1 | 1 | 1 | 1 |
| Contact angle (°) water | 60 | 65 | 73 | 40 |
| Contact angle (°) hexadecane | 20 | 23 | 25 | 25 |
| Eraser rubbing durability (500 g loaded) | 1000 | 1500 | 1500 | <500 |

As understood from the above results, it was confirmed that in the surface-treating layer formed from the surface-treating agent containing the compound of the present invention, even when fingerprint is adhered, visibility of fingerprint is low and friction durability is high.

INDUSTRIAL APPLICABILITY

The present invention is suitably applied for forming a surface-treating layer on a surface of various base materials, in particular, an optical member in which transparency is required.

The present invention includes following embodiments:

Embodiment 1

A compound of the following formula (A1) or (A2):

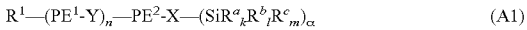

$$R^1\text{—}(PE^1\text{-}Y)_n\text{—}PE^2\text{-}X\text{—}(SiR^a{}_kR^b{}_lR^c{}_m)_\alpha \quad (A1)$$

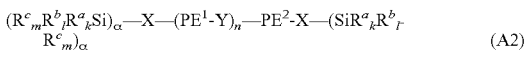

$$(R^c{}_mR^b{}_lR^a{}_kSi)_\alpha\text{—}X\text{—}(PE^1\text{-}Y)_n\text{—}PE^2\text{-}X\text{—}(SiR^a{}_kR^b{}_lR^c{}_m)_\alpha \quad (A2)$$

wherein:
$R^1$ is $OR^4$;
$R^4$ is a hydrogen atom or an alkyl group having 1-20 carbon atoms;
$PE^1$ is each independently at each occurrence a group of the formula:

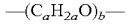

$$\text{—}(C_aH_{2a}O)_b\text{—}$$

wherein:
a is an integer of 1-6 independently per a unit in parentheses with the subscript b;
b is each independently at each occurrence an integer of 1-200;
Y is each independently at each occurrence a single bond or —CONH—$R^5$—NHCOO—;
$R^5$ is each independently at each occurrence a divalent organic group;
n is an integer of 1-50;
$PE^2$ is a single bond or the above —$(C_aH_{2a}O)_b$— group;
X is each independently a single bond or a 2-10 valent organic group;
$R^a$ is each independently at each occurrence —Z—$SiR^{71}{}_pR^{72}{}_qR^{73}{}_r$;
Z is each independently at each occurrence an oxygen atom or a divalent organic group;
$R^{71}$ is each independently at each occurrence $R^{a'}$;
$R^{a'}$ has the same definition as that of $R^a$;
in $R^a$, the number of Si atoms which are straightly linked via the Z group is up to five;
$R^{72}$ is each independently at each occurrence a hydroxyl group or a hydrolyzable group;
$R^{73}$ is each independently at each occurrence a hydrogen atom or a lower alkyl group;
p is each independently at each occurrence an integer of 0-3;
q is each independently at each occurrence an integer of 0-3;
r is each independently at each occurrence an integer of 0-3;
in one $R^a$, the sum of p, q and r is 3;
$R^b$ is each independently at each occurrence a hydroxyl group or a hydrolyzable group;
$R^c$ is each independently at each occurrence a hydrogen atom or a lower alkyl group;
k is each independently at each occurrence an integer of 0-3;
l is each independently at each occurrence an integer of 0-3;
m is each independently at each occurrence an integer of 0-3;
in a unit in parentheses with the subscript a, the sum of k, l and m is 3;
α is each independently an integer of 1-9; and
in $(SiR^a{}_kR^b{}_lR^c{}_m)_\alpha$ units which are connected to the same X, a total of Si atoms having $R^b$ or $R^{72}$ is 2 or more.

Embodiment 2

The compound according to Embodiment 1 wherein X is each independently a 3-10 valent organic group, and a is each independently an integer of 2-9.

Embodiment 3

The compound according to Embodiment 1 or 2 wherein k is an integer of 1-3.

Embodiment 4

The compound according to any one of Embodiments 1-3 which is a compound of the formula (A1):

$$R^1\text{—}(PE^1\text{-}Y)_n\text{—}PE^2\text{-}X\text{—}(SiR^a{}_kR^b{}_lR^c{}_m)_a \quad (A1)$$

wherein $R^1$, $PE^1$, $PE^2$, X, Y, $R^a$, $R^b$, $R^c$, k, l, m, n and a are as defined in Embodiment 1.

Embodiment 5

The compound according to any one of Embodiments 1-4 wherein in $PE^1$ and $PE^2$, —$(C_aH_{2a}O)_b$— are each independently a group of the formula:

$$\text{—}(C_4H_8O)_{c'}\text{—}(C_3H_6O)_{d'}\text{—}(C_2H_4O)_{e'}\text{—}$$

wherein:
c, d and e are each independently an integer of 0-200;
the sum of c, d and e is 1-200; and
the occurrence order of the respective repeating units in parentheses with the subscript c, d or e is not limited in the formula.

Embodiment 6

The compound according to any one of Embodiments 1-5 wherein $PE^1$ and $PE^2$ are each independently at each occurrence a group selected from:

—$(C_4H_8O)_{c'}$—

—$(C_3H_6O)_{d'}$—, and

—$(C_2H_4O)_{e'}$— wherein c, d and e are each independently an integer of 1-200.

Embodiment 7

The compound according to any one of Embodiments 1-6 wherein $PE^1$ and $PE^2$ are each independently at each occurrence a group of the formula:

—$(C_4H_8O)_{c'}$— wherein c is an integer of 1-200.

Embodiment 8

The compound according to any one of Embodiments 5-7 wherein $C_4H_8O$ is $CH_2CH_2CH_2CH_2O$;

$C_3H_6O$ is $CH_2CHCH_3O$; and $C_2H_4O$ is $CH_2CH_2O$.

Embodiment 9

The compound according to any one of Embodiments 1-8 wherein
Y is a group of the following formula:

—CONH—$R^5$—NHCOO— wherein $R^5$ is

—$(CH_2)_{x'}$— wherein x' is an integer of 1-6;

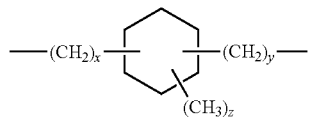

wherein x and y are each independently an integer of 0-6; z is an integer of 0-10; or

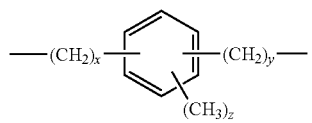

wherein x and y are each independently an integer of 0-6; and
z is an integer of 0-4.

Embodiment 10

The compound according to any one of Embodiments 1-9 wherein
X is a group of the following formula:

—CONH$^{61}$—$R_{62}(R^{61}NHCO$—$R^{63})_{\beta-1}$ wherein:
$R^{61}$ is each independently a divalent hydrocarbon group;
$R^{62}$ is a β valent organic group;
β is an integer of 2-6;
$R^{63}$ is —O—$R^{67}$ $(OR^{68})_s(O$—$X^1$—$)_t$;
$R^{67}$ is a γ valent organic group;
γ is an integer of 2-8;
$R^{68}$ is a hydrogen atom or an alkyl group having 1-6 carbon atoms;
$X^1$ is a divalent organic group;
s is an integer of 0-6;
t is an integer of 1-7; and
the sum of s and t is γ-1.

Embodiment 11

The compound according to Embodiment 10 wherein X is a group of the following formula:

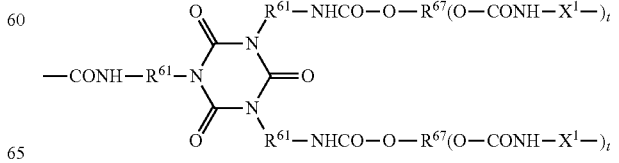

33 wherein:
R$^{61}$ is each independently a divalent hydrocarbon group;
R$^{67}$ is each independently a 2-8 valent organic group;
X$^1$ is a divalent organic group; and
t is each independently, an integer of 1-7.

Embodiment 12

The compound according to any one of Embodiments 1-11 wherein a number average molecular weight of PE$^1$ is 500-10,000.

Embodiment 13

The compound according to any one of Embodiments 1-12 wherein glass transition temperature is within the range of −70° C. to 40° C.

Embodiment 14

A surface-treating agent comprising at least one compound of the formula (A1) or the formula (A2) according to any one of Embodiments 1-13.

Embodiment 15

The surface-treating agent according to Embodiment 14 further comprising a solvent.

Embodiment 16

The surface-treating agent according to Embodiment 14 or 15 further comprising a polyol of the following formula:

HO—(C$_a$H$_{2a}$O)$_{b'}$—OH wherein:
a' is an integer of 1-6 each independently per a unit in parentheses with the subscript b'; and
b' is each independently at each occurrence an integer of 1-300.

Embodiment 17

The surface-treating agent according to any one of Embodiments 14-16 which is able to form a surface treating layer having a contact angle to n-hexadecane of 40° or less.

Embodiment 18

The surface-treating agent according to any one of Embodiments 14-17 which is able to form a surface treating layer having a coefficient of kinetic friction of 0.30 or less.

Embodiment 19

An article comprising a base material and a layer which is formed on a surface of the base material from the surface-treating agent according to any one of Embodiments 14-18.

Embodiment 20

The article according to Embodiment 19 wherein the article is an optical member.

Embodiment 21

The article according to Embodiment 19 or 20 wherein the article is a display or a touch panel.

34

The invention claimed is:
1. A compound of the following formula (A1) or (A2):

$$R^1\text{—}(PE^1\text{-}Y)_n\text{—}PE^2\text{-}X\text{—}(SiR^a_kR^b_lR^c_m)_\alpha \quad (A1)$$

$$(R^c_mR^b_lR^a_kSi)_\alpha\text{—}X\text{—}(PE^1\text{-}Y)_n\text{—}PE^2\text{-}X\text{—}(SiR^a_kR^b_l\\R^c_m)_\alpha \quad (A2)$$

wherein:
R$^1$ is OR$^4$;
R$^4$ is a hydrogen atom or an alkyl group having 1-20 carbon atoms;
PE$^1$ is each independently at each occurrence a group of the formula:

—(C$_a$H$_{2a}$O)$_b$— wherein:
a is an integer of 1-6 independently per a unit in parentheses with the subscript b;
b is each independently at each occurrence an integer of 1-200;
Y is each independently at each occurrence a single bond or —CONH—R$^5$—NHCOO—;
R$^5$ is each independently at each occurrence a divalent organic group;
n is an integer of 1-50;
PE$^2$ is a single bond or the above —(C$_a$H$_{2a}$ O)$_b$— group;
X is each independently a single bond, a divalent group of the following formula:

—(R$^{30}$)$_{r'}$—[(R$^{31}$)$_{p'}$—(X$^a$)$_{q'}$]— wherein:
R$^{30}$ is —CONH— or —CO—;
r' is 0 or 1,
R$^{31}$ is a single bond, —(CH$_2$)$_{s'}$— or an o-, m- or p-phenylene group,
s' is an integer of 1-20,
X$^a$ is —(X$^b$)$_{l'}$—,
X$^b$ is each independently at each occurrence a group selected from the group consisting of —O—, —S—, an o-, m- or p-phenylene group, —C(O)O—, —Si(R$^{33}$)$_2$—, —(Si(R$^{33}$)$_2$O)$_{m'}$—Si(R$^{33}$)$_2$—, —CONR$^{34}$—, —O—CONR$^{34}$—, —NR$^{34}$— and —(CH$_2$)$_{n'}$—,
R$^{33}$ is each independently at each occurrence a phenyl group, a C$_{1-6}$ alkyl group or a C$_{1-6}$ alkoxy group,
R$^{34}$ is each independently at each occurrence a hydrogen atom, a phenyl group or a C$_{1-6}$ alkyl group,
m' is each independently at each occurrence an integer of 1-100,
n' is each independently at each occurrence an integer of 1-20,
l' is an integer of 1-10,
p' is 0 or 1,
q' is 0 or 1, and
at least one of p' and q' is 1, and the occurrence order of the respective repeating units in parentheses with the subscript p' or q' in [(R$^{31}$)$_{p'}$—(X$^a$)$_{q'}$] is not limited in the formula, or
a group of —CONH—R$^{61}$—R$^{62}$ (R$^{61}$—NHCO—R$^{63}$)$_{\beta-1}$ wherein:
R$^{61}$ is each independently a divalent hydrocarbon group;
R$^{62}$ is a β valent organic group;
β is an integer of 2-6;
R$^{63}$ is —O—R$^{67}$(OR$^{68}$)$_s$(O—X$^{1a}$-)$_t$;
R$^{67}$ is a γ valent organic group;

γ is an integer of 2-8;
$R^{68}$ is a hydrogen atom or an alkyl group having 1-6 carbon atoms;
$X^{1a}$ is a divalent organic group;
s is an integer of 0-6;
t is an integer of 1-7; and
the sum of s and t is γ-1;
$R^a$ is each independently at each occurrence —Z—$SiR^{72}_3$;
Z is each independently at each occurrence an oxygen atom or a divalent organic group;
$R^{72}$ is each independently at each occurrence a hydroxyl group or a hydrolyzable group;
$R^b$ is each independently at each occurrence a hydroxyl group or a hydrolyzable group;
$R^c$ is each independently at each occurrence a hydrogen atom or a lower alkyl group;
k is each independently at each occurrence an integer of 0-3;
l is each independently at each occurrence an integer of 0-3;
m is each independently at each occurrence an integer of 0-3;
in a unit in parentheses with the subscript a, the sum of k, l and m is 3;
α is each independently an integer of 1-9; and
in $(SiR^a_k R^b_l R^c_m)_\alpha$ units which are connected to the same X, a total of Si atoms having $R^b$ or $R^{72}$ is 2 or more.

2. The compound according to claim 1 wherein k is an integer of 1-3.

3. The compound according to claim 1 which is a compound of the formula (A1):

$$R^1—(PE^1-Y)_n—PE^2-X—(SiR^a_k R^b_l R^c_m)_\alpha \quad (A1)$$

wherein $R^1$, k, l, m, n and a are as defined in claim 1.

4. The compound according to claim 1 wherein in $PE^1$ and $PE^2$, —$(C_aH_{2a}O)_b$— are each independently a group of the formula:

—$(C_4H_8O)_c$—$(C_3H_6O)_{d'}$—$(C_2H_4O)_{e'}$— wherein:
c, d and e are each independently an integer of 0-200;
the sum of c, d and e is 1-200; and
the occurrence order of the respective repeating units in parentheses with the subscript c, d or e is not limited in the formula.

5. The compound according to claim 1 wherein $PE^1$ and $PE^2$ are each independently at each occurrence a group selected from:

—$(C_4H_8O)_{c'}$—

—$(C_3H_6O)_{d'}$—, and

—$(C_2H_4O)_{e'}$— wherein c, d and e are each independently an integer of 1-200.

6. The compound according to claim 1 wherein $PE^1$ and $PE^2$ are each independently at each occurrence a group of the formula:

—$(C_4H_8O)_c$— wherein c is an integer of 1-200.

7. The compound according to claim 4 wherein $C_4H_8O$ is $CH_2CH_2CH_2CH_2O$;

$C_3H_6O$ is $CH_2CHCH_3O$; and $C_2H_4O$ is $CH_2CH_2O$.

8. The compound according to claim 1 wherein Y is a group of the following formula:

—CONH—$R^5$—NHCOO— wherein $R^5$ is
—$(CH_2)_{x'}$— wherein x' is an integer of 1-6;

—(CH$_2$)$_x$—[cyclohexane ring with (CH$_3$)$_z$]—(CH$_2$)$_y$— wherein x and y are each independently an integer of 0-6;
z is an integer of 0-10; or —(CH$_2$)$_x$—[benzene ring with (CH$_3$)$_z$]—(CH$_2$)$_y$— wherein x and y are each independently an integer of 0-6; and
z is an integer of 0-4.

9. The compound according to claim 1 wherein X is a group of the following formula:

—CONH—$R^{61}$—$R^{62}(R^{61}$—NHCO—$R^{63})_{\beta-1}$ wherein:
$R^{61}$ is each independently a divalent hydrocarbon group;
$R^{62}$ is a β valent organic group;
β is an integer of 2-6;
$R^{63}$ is —O—$R^{67}$ $(OR^{68})_s$ $(O—X^1)_t$;
$R^{67}$ is a γ valent organic group;
γ is an integer of 2-8;
$R^{68}$ is a hydrogen atom or an alkyl group having 1-6 carbon atoms;
$X^1$ is a divalent organic group;
s is an integer of 0-6;
t is an integer of 1-7; and
the sum of s and t is γ-1.

10. The compound according to claim 9 wherein X is a group of the following formula:

—CONH—$R^{61}$—[isocyanurate ring with two $R^{61}$—NHCO—O—$R^{67}$(O—CONH—$X^1$—)$_t$ groups]

wherein:
$R^{61}$ is each independently a divalent hydrocarbon group;
$R^{67}$ is each independently a 2-8 valent organic group;

$X^1$ is a divalent organic group; and t is each independently, an integer of 1-7.

11. The compound according to claim 1 wherein a number average molecular weight of $PE^1$ is 500-10,000.

12. The compound according to claim 1 wherein glass transition temperature is within the range of −70° C. to 40° C.

13. A surface-treating agent comprising at least one compound of the formula (A1) or the formula (A2) according to claim 1.

14. The surface-treating agent according to claim 13 further comprising a solvent.

15. The surface-treating agent according to claim 13 further comprising a polyol of the following formula:

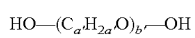

wherein:
  a' is an integer of 1-6 each independently per a unit in parentheses with the subscript b'; and
  b' is each independently at each occurrence an integer of 1-300.

16. The surface-treating agent according to claim 13 which is able to form a surface treating layer having a contact angle to n-hexadecane of 40° or less.

17. The surface-treating agent according to claim 13 which is able to form a surface treating layer having a coefficient of kinetic friction of 0.30 or less.

18. An article comprising a base material and a layer which is formed on a surface of the base material from the surface-treating agent according to claim 13.

19. The article according to claim 18 wherein the article is an optical member.

20. The article according to claim 18 wherein the article is a display or a touch panel.

* * * * *